OR  3,539,242   T3054W

United States Patent

[11] 3,539,242

| [72] | Inventors | Jack J. Burch;<br>Frank L. Skaggs, Dallas, Texas |
|---|---|---|
| [21] | Appl. No. | 679,708 |
| [22] | Filed | Nov. 1, 1967 |
| [45] | Patented | Nov. 10, 1970 |
| [73] | Assignee | Texas Instruments Incorporated<br>Dallas, Texas<br>a corporation of Delaware |

[54] ON-AXIS HOLOGRAPHY
16 Claims, 7 Drawing Figs.

[52] U.S. Cl................................................. 350/3.5,
350/162
[51] Int. Cl................................................. G02b 5/18
[50] Field of Search....................................... 350/3.5,
162

[56] References Cited

Horman, APPLIED OPTICS, Vol. 4, No. 3, pp 333— 336 (3/1965)

Brown et al. APPLIED OPTICS, Vol. 5, No. 6, pp. 967— 969 (6/1966).

Weaver et al. APPLIED OPTICS, Vol. 5, No. 7, pp. 1248— 1249 (7/1966).

*Primary Examiner*—David Schonberg
*Assistant Examiner*—Robert L. Sherman
*Attorneys*—Samuel M. Mims, Jr., James O. Dixon, Andrew M. Hassell, Harold Levine, John E. Vandigriff, Rene E. Grossman, Richards, Harris and Hubbard, Jerry W. Mills, Timothy L. Burgess, V. Bryan Medlock, Jr. and Harold E. Meier ABSTRACT: A method of hologram construction wherein a collimated coherent light beam generates a signal wavefront of a function to a recording medium. Light from the function passes through a spherical lens and a Fourier transform is generated on the recording medium located at the front focal plane of the lens. A second collimated coherent light beam is provided to bias the wavefront generated as a result of illumination of the function such that it is always positive at the recording media. The axis of the wavefront transmitted through the spherical lens and the axis of the bias beam are coincident.

Patented Nov. 10, 1970
3,539,242
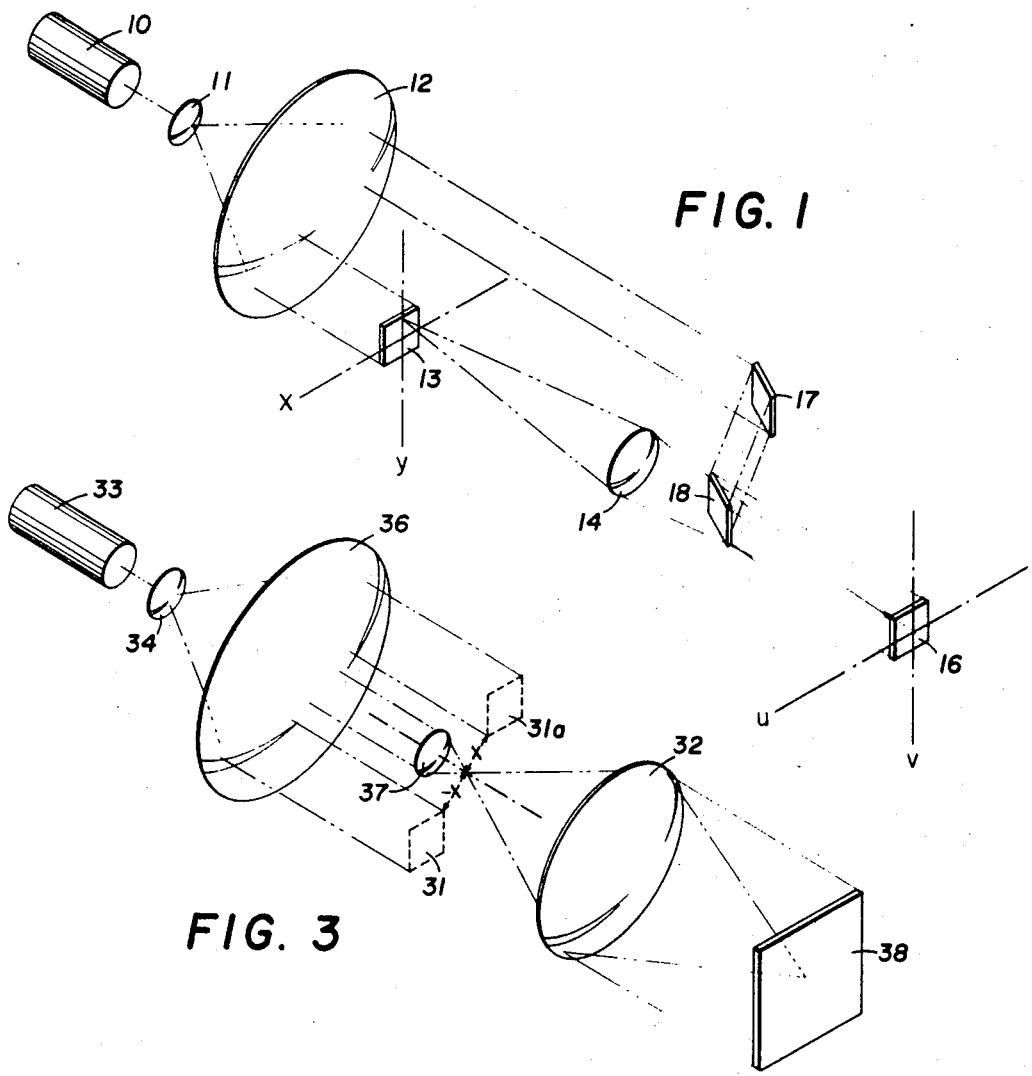
FIG. 1
FIG. 3
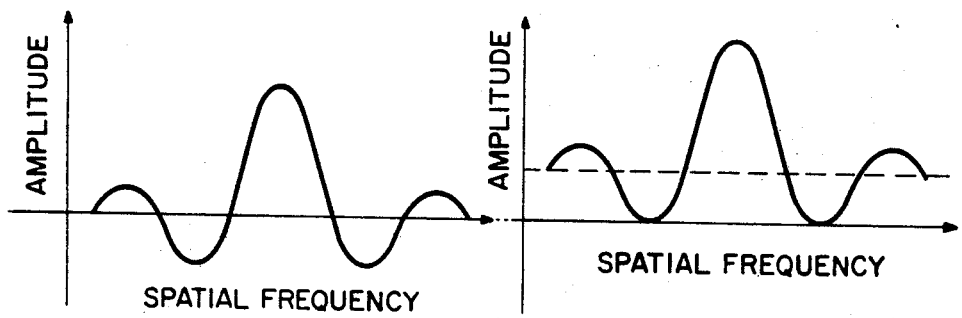
FIG. 2
INVENTORS
JACK J. BURCH
FRANK L. SKAGGS
ATTORNEY

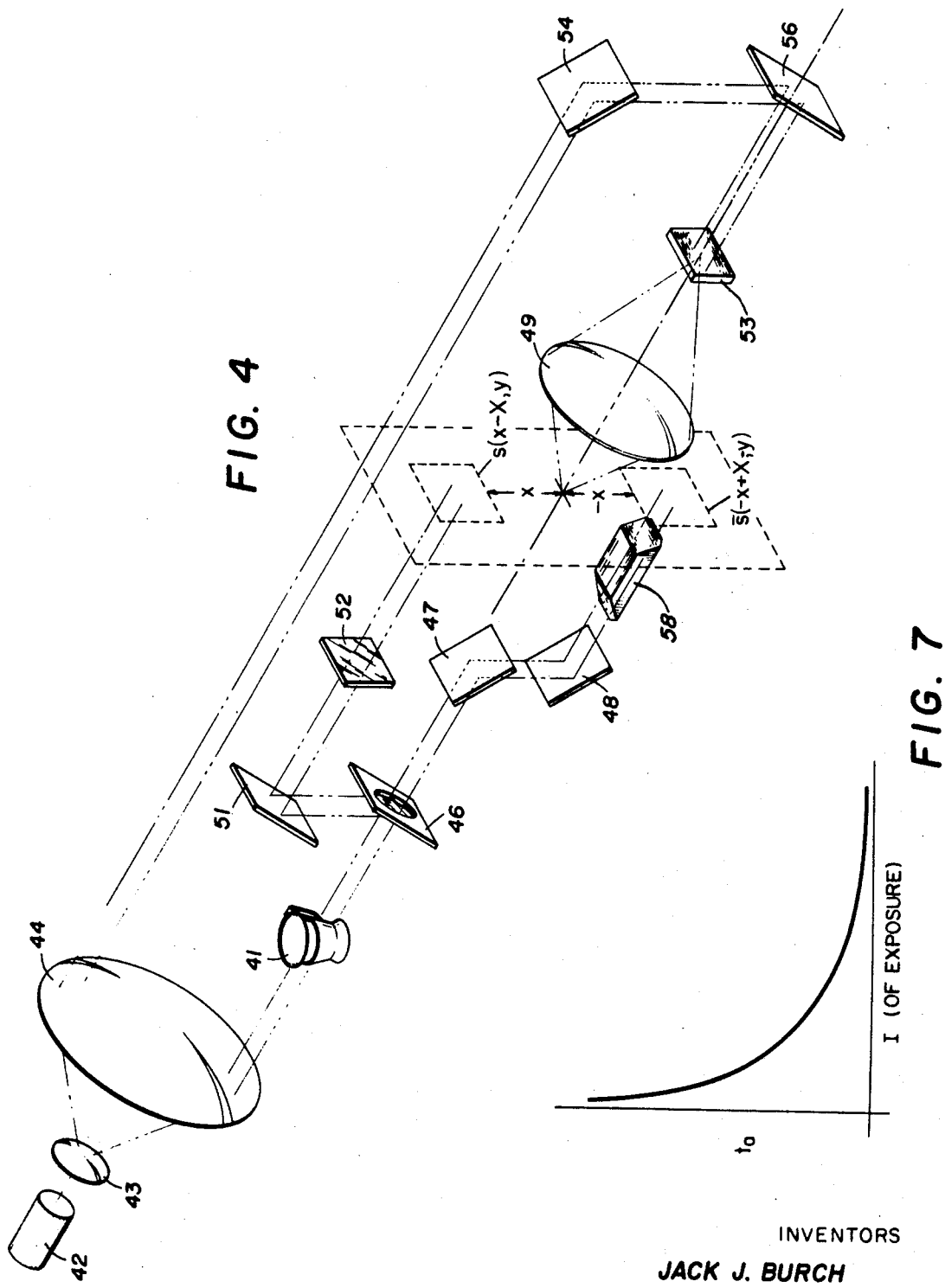

INVENTORS
JACK J. BURCH
FRANK L. SKAGGS

*Harold E. Meier*

ATTORNEY

ON-AXIS HOLOGRAPHY

This invention relates to a method of on-axis holography and more particularly to a method of holography wherein the axis of the generated wavefront is coincident with the axis of a biasing wavefront.

Conventional interferometric methods of spatial frequency filter synthesis depend upon the recording of a cross term between a signal beam and a reference beam. An optical transformation of a spatial signal pattern produces a light amplitude distribution which is added to the reference wave prior to photographic detection. It is essential in conventional interferometric methods that the reference beam contain a linear-phase term. The conventional interferometric methods generate a real, positive quantity by performing square-law detection on the sum of the spatial signal pattern and the superimposed reference beam. Square-law detection produces an autocorrelation term in the reconstructed wavefront which has a detrimental effect upon the optical efficiency of the hologram. Thus, an object of the present invention is to provide a method of hologram construction wherein improved optical efficiency is realized in the reconstruction process.

In accordance with the present invention, a hologram is constructed for encoding a function having positive, negative, real and imaginary components into a function having only real, positive components by recording a biased Fourier transform wavefront. In the reconstruction process, an optical Fourier transform of a hologram synthesized by this method will reconstruct a pattern in which the autocorrelation function does not occur because of the absence of square-law detection performed on the recorded pattern. The reconstructed pattern contains the original wavefront and its spatial reverse form in the usual manner, displaced from optical axis, however, the separation between the two patterns can be less thereby allowing a lower resolution hologram recording than would be required by conventional recording techniques. The hologram can thus be recorded on a photographic material whose amplitude transmission is linear with respect to the square root of the light intensity.

In accordance with a specific embodiment of the invention, an on-axis hologram is constructed by generating a signal wavefront from a desired function at an energy sensitive surface and biasing the wavefront by an energy wave such that it will be both positive and real as recorded on said energy sensitive surface.

A more complete understanding of the invention and its advantages will be apparent from the specification and claims and from the accompanying drawings illustrative of the invention.

Referring to the drawings:

FIG. 1 is a schematic of an optical on-axis interferometric hologram generating system;

FIG. 2 symbolizes both biased and unbiased wavefronts generated by an object wave transmitted through a spherical lens, FIG. 3 is an alternate embodiment of an optical on-axis interferometric hologram generating system;

FIG. 4 is a schematic of a system for constructing an on-axis hologram of a three-dimensional object;

FIGS. 1 or 3 is employed as a spatial filter;

Figure 6:
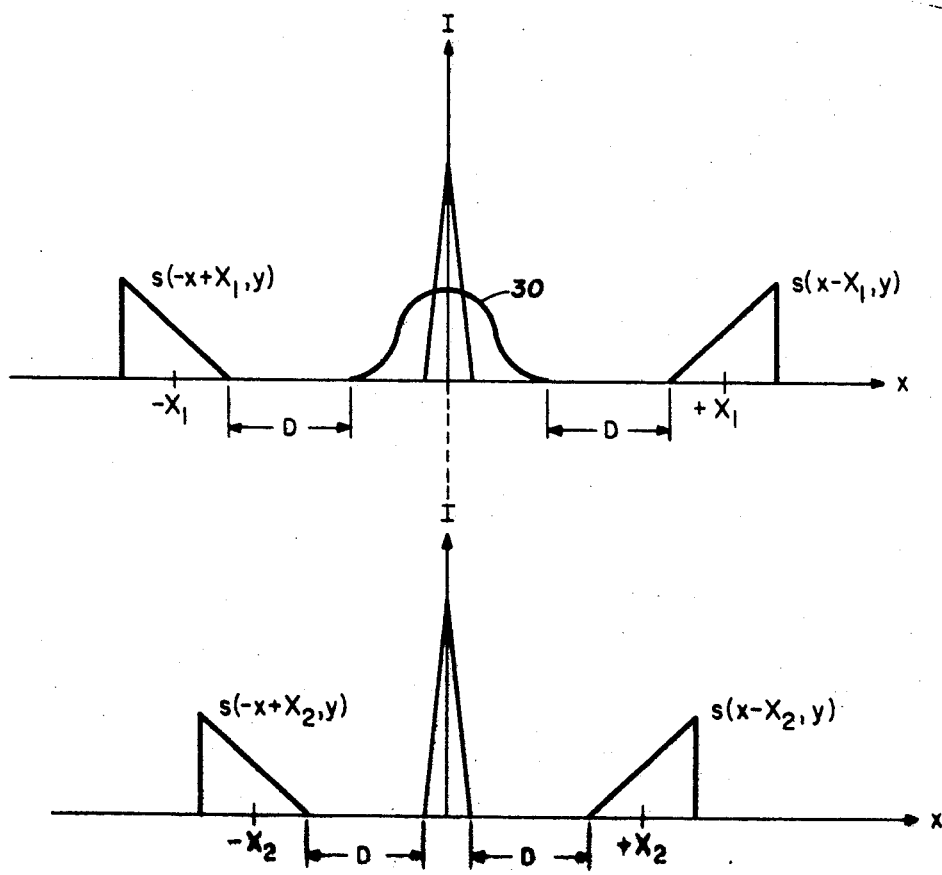

FIG. 6 symbolizes the reconstruction pattern of a conventional interferometric hologram and an on-axis hologram; and FIG. 7 is a plot of light amplitude transmission versus light intensity for a typical low resolution photographic emulsion.

Referring to FIG. 1, there is shown a system for constructing a hologram including a laser 10 generating a monochromatic coherent light beam transmitted through a diverging lens 11. A collimating lens 12 intercepts the expanding light beam emerging from the lens 11 and forms a collimated expanded light beam. One portion of the light beam from the collimating lens 12 illuminates an object plane 13 located at the input focal plane of a spherical lens 14. The block identified as the object 13 is intended to represent any desired function either real or complex which, when illuminated, generates a spatial signal pattern at the input focal plane of the lens 14. Perpendicular to the optical axis of the lens 14 at its output focal plane there is formed a Fraunhofer diffraction pattern of the function represented by block 13. A recording medium 16, such as a photographic emulsion, is located at this plane perpendicular to the optical axis of the lens 14.

Another portion of the collimated beam transmitted through the lens 12 is reflected from a mirrored surface 17 to a beam splitter 18. Light reflected from the beam splitter 18 to the recording medium 16 is identified as a "bias beam" and consists of a plane wave with no linear phase factor; that is, the bias beam is introduced to the spatial frequency plane of the lens 14 with its axis coincident with the signal beam axis.

A hologram is essentially a means for encoding a function having positive, negative, real and imaginary components into a function having only positive and real components. Consider the object 13 to be in an $x$-$y$ plane and representing a function $f(x,y)$ which, in general, will be represented by:

$$f(x, y) = s(x-X, y) + \bar{s}(-x+X, -y) \quad (1)$$

where $s$ is a complex function having the form $s(x, y) = |s(x, y)| \exp{-i\theta(x, y)}$ where $\theta(x, y)$ is the phase term of $s$. $X$ is a displacement parameter along the $x$ axis. The notation $\bar{s}$ refers to the complex conjugate of $s$, i.e., $\bar{s}(x, y) = |s(x, y)| \exp{+i\theta(x, y)}$. The function $s(x, y)$ reflected in the $x-y$ plane in the form $s(-x, -y)$ is termed the "mirrored" function of $s(x, y)$. The mirrored conjugate of $s$ is expressed as $\bar{s}(-x, -y) = |s(-x, -y)| \exp{+i\theta(-x, -y)}$. Since the recording medium 16 is located on the output focal plane of the lens 14, identified as the $uv$ plane, then the Fourier transform of the function $f(x, y)$ is established on the recording medium. From well-known Fraunhofer diffraction and Fourier transform theory, the amplitude of the light waves on the recording medium 16 as a result of a spatial signal generated by the object 13 will be:

$$f(x, y) \Longrightarrow F(u, v) \quad (2)$$

where $\Longrightarrow$ denotes Fourier transformation. Add to the Fraunhofer diffraction pattern of $f(x,y)$ the bias beam reflected from the beam splitter 18 then the intensity pattern of the resulting light distribution is given by the equation:

$$I = [F(u, v) + B^2] \quad (3)$$

where B is the amplitude of the bias beam.

Equation (3) defines the wavefront pattern generated at the recording medium 16 by action of the lens 14 and the beam splitter 18. Referring to FIG. 2, the left curve symbolizes a light distribution pattern in the $u$-$v$ plane as generated by the lens 14 alone. The right curve of FIG. 2 symbolizes this same curve biased by a light beam from the beam splitter 18 such that the function recorded is positive for all values of the generated diffraction pattern.

Thus, an on-axis hologram can be constructed by illuminating the object 13 with a collimated coherent light beam from a source such as the laser 10. An energy wavefront is generated in accordance with Fourier transform theory by the spherical lens 14 positioned a focal distance from the object plane 13 on a recording medium 16 also positioned a focal length from the lens. A real positive function is formed on the recording medium 16 by the beam splitter 18 generating a bias beam that is introduced to the spatial frequency plane on-axis. To permanently record the light distribution pattern formed on the recording medium 16, it may include a photographic emulsion which is processed by developing and fixing.

Referring to FIG. 3, there is shown another system for generating an on-axis hologram wherein the object 31 and its conjugated mirror image 31a are located at the input focal plane of a condensing lens 32. Objects 31 and 31a correspond respectively to $s(x-X, y)$ and $\bar{s}(-x+X, -y)$ of equation (1) above. A laser 33 generates a beam of light which is expanded by a diverging lens 34 and collimated by a lens 36. The coherent collimated light beam emerging from the lens 36 illuminates the object 31 and its conjugated mirror image 31a and is focused by means of a converging lens 37 at the front focal plane of the lens 32. A Fraunhofer diffraction pattern of the wavefronts transmitted through the object 31 and its conjugated mirror image 31a is formed at the output focal plane of the lens 32 on a surface 38. Light focused by the lens 37 will be collimated by the lens 32 and introduced to the spatial frequency plane to bias the Fraunhofer diffraction pattern such that it is always real and positive.

The amplitude of the wavefronts at the surface 38 will be given by the Fourier transform of the object 31 and its mirrored conjugate 31a. From equation (1) above, the object 31 is represented by the $s$ term and its mirrored conjugate by the $\bar{s}$ term. For each of these terms, the respective wavefronts are given by the expressions:

$$s(x-X, y) \Longrightarrow S(u, v) \exp(-jXu) \quad (4)$$
$$\bar{s}(-x+X, -y) \Longrightarrow \bar{S}(u, v) \exp(+jXu) \quad (5)$$

where X is the displacement of the object 31 and its mirrored conjugate 31a from the optical axis of the lens 32. If $S(u,v)$ is defined by the expression:

$$S(u, v) = R(u, v) + j \pm (u, v) \quad (6)$$

where $R(u,v)$ and $I(u,v)$ are the respective real and imaginary parts of $s(x,y)$, respectively, then:

$$F(u, v) = R(u, v) \exp(-jXu) + jI(u, v) \exp(-jXu)$$
$$+ R(u, v) \exp(+jXu) - jI(u, v) \exp(+jXu)$$
$$= 2R(u, v) \cos Xu + 2I(u, v) \sin Xu \quad (8)$$

The function $F(u,v)$ is both positive and negative as symbolized by the left curve of FIG. 2. A bias term B added to $F(u,v)$ forms a real, positive function, $F(u,v) + B$, as explained previously with respect to the system of FIG. 1.

Where the wavefront to be recorded in the hologram represents an object existing in three-dimensional space, it is first necessary to generate an object wavefront and its mirrored conjugate prior to recording by means of on-axis holography. Referring to FIG. 4, there is shown a system for on-axis holographic recording of an object 41 existing in three-dimensional space. A laser 42 generates a coherent collimated light beam which is expanded by a diverging lens 43 and collimated by a lens 44. A portion of the light beam from the lens 44 is transmitted through or reflected from the object 41 to a beam splitter 46. Light passing through the beam splitter 46 is reflected first from a mirrored surface 47 and then from a mirrored surface 48 through Dove prism 58 with a roof on the hypotenuse face to form a mirror image wavefront of the object 41 at the front focal plane of a lens 49. Dove prism 58 causes an inversion about the $x$ axis and the $y$ axis. The mirrors 47 and 48 are positioned such that the wavefront is displaced a distance X from the optical axis of the lens 49. Light reflected by the beam splitter 46 is reflected from a mirrored surface 51 and transmitted through an optical path-length compensator 52 to form a wavefront of the object 41 at the front focal plane of the lens 49 displaced a distance X from its optical axis. The optical element 52 also imparts a half wavelength phase shift to the wavefront in order to form the complex conjugate of the wavefront. The lens 49 generates the Fraunhofer diffraction pattern of the object wavefront and its complex conjugate onto a surface 53 located at the output focal plane of the lens 49.

Another portion of the collimated light beam transmitted through the lens 44 is reflected from a mirror 54 and again from a mirror 56 to a surface 53. The beam is reflected from the mirror 56 to the output focal plane of the lens 49 to bias the Fraunhofer diffraction pattern such that is is always real and positive. Thus, it is possible to bias the recorded wavefront from either the front or rear of the recording surface. The wavefront pattern recorded on the surface 53 is given by equation (7) above as established in the discussion of FIG. 3.

Figure 5:
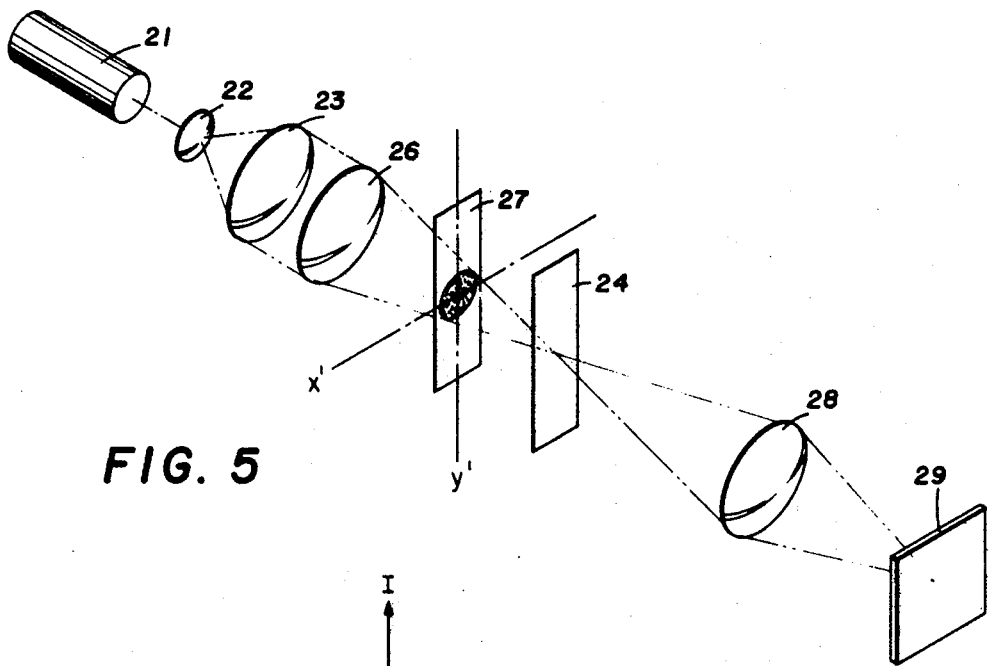
FIG. 5 is an optical schematic of a reconstruction system wherein a hologram constructed by the system of either

The resulting on-axis hologram constructed by the systems described above may be used for image reconstruction or as a spatial frequency filter. Referring to FIG. 5, there is shown a system wherein the on-axis hologram constructed as described above functions as a spatial frequency filter. A laser 21 generates a monochromatic collimated light beam transmitted to a diverging lens 22 to be expanded and further collimated by a lens 23. Light transmitted through the lens 23 is focused on the spatial frequency filter 24 by a transforming lens 26. Located between the lens 26 and the filter 24 is an imagery pattern 27 containing the function to be filtered. A transforming lens 28 images the light distribution pattern of 27 on a correlation plane 29. In operation, data is introduced into the optical system by passing the wide beam collimated laser light through the imagery pattern 27. The millions of bits of information in the pattern 27 are transformed into a two-dimensional spatial frequency plane and modified by the spatial frequency filter 24. A second optical transformation by means of the lens 28 produces an output image on the correlation plane 29 which is a filtered modification of the pattern 27.

Three spatially separated images will form on the plane 29 in accordance with Fourier transform theory by operation of the system of FIG. 5. The distribution of these images is shown in the lower portion of FIG. 6 and given by the expression:

$$s(x-X, y) + \bar{s}(-x+X, -y) + KB\Delta(x, y)$$

The first term represents the image of the real object displaced from the optical axis by a distance X; the second term represents a mirror image of the object (with a conjugate phase) and the third term is an approximate $\Delta$ function lying on the optical axis. Diffraction effects from the bias beam (uniform light transmission) contributes to the $\Delta$ impulse on the optical axis. An important advantage gained by constructing a hologram as described above is the absence of an autocorrelation function on the optical axis such as symbolized by the spatial distribution 30 in the upper portion of FIG. 6.

In spatial filtering applications, the reconstructed signal and its autocorrelation function must be separated by the distance D corresponding to the width along the $x'$ axis of the data to be filtered. This is necessary to prevent overlap of the filtered data. For a given separation D between the signal and the on-axis distribution, the displacement X of the lower distribution pattern of FIG. 6 can be made less than the displacement X of the upper distribution pattern by a distance equal to the width of the recorded function. This reduction in construction pattern separation allows a lower-resolution hologram recording medium than would be possible by conventional off-axis interferometric techniques of hologram construction.

Referring to FIG. 7 there is shown a curve of transmission amplitude versus intensity of exposure of a developed emulsion which can be used in the construction of an on-axis hologram. The material has an amplitude transmission which is linear with respect to the square root of the light intensity; this characteristic is approximated by low contrast films with a gamma of 1. In the construction of a hologram, light intensity (square-law) detection will naturally occur but since the light-amplitude distribution at the recording medium is real and positive, this operation is reversible. Thus, using a low contrast film having a characteristic curve shown in FIG. 7 reverses the square-law detection thereby increasing the optical efficiency of the reconstructed wave.

While several embodiments of the invention, together with modifications thereof, have been described in detail herein and shown in the accompanying drawings, it will be evident that various further modifications are possible without departing from the scope of the invention.

We claim:
1. Apparatus for constructing an on-axis hologram on a recording medium of a three-dimensional object comprising:
   means for generating a coherent collimated light beam;
   means for directing a portion of said light beam from said object;
   a spherical condensing lens positioned a focal length from said recording medium;

means for generating an object wavefront from the light reflected by said object at the front focal plane of said lens displaced from the axis thereof by a distance X;

means for generating a conjugated mirror image of the object wavefront from the light directed from said object at the front focal plane of said lens and displaced from its optical axis by a distance X opposite the object wavefront and thereby form at the recording medium the Fourier transform of the object wavefront and its conjugated mirror image; and means for directing a portion of said coherent collimated beam to the recording medium to be added to said Fourier transform in a manner such that the axis of all wavefronts coincide to produce a real and positive recorded wavefront.

2. Apparatus for constructing an on-axis hologram on a recording medium comprising:

means for generating an energy wavefront of a desired function;

means for generating a conjugated mirror image wavefront of said desired function;

a lens positioned at a focal length from said wavefronts for generating the Fourier transform thereof at said recording medium positioned at the output focal plane of said lens; and means for combining a biasing wavefront with the Fourier transform of said wavefronts in a manner such that the axis of all wavefronts coincide to produce a real and positive recorded function.

3. Apparatus for constructing an on-axis hologram as set forth in claim 2 wherein said energy wavefront and its conjugated mirror image are positioned opposite each other at the focal plane of said lens and displaced from its optical axis by a distance of X.

4. Apparatus for constructing an on-axis hologram comprising:

means for generating a coherent light beam;

means for generating an object wavefront and a conjugated mirror image wavefront of said object wavefront from said light beam;

a recording medium;

optical means for forming the Fourier transform of said wavefronts at said recording medium; and means for combining at the recording medium a bias wavefront with the Fourier transform formed by said optical means to produce a real and positive amplitude of the combined wavefronts.

5. Apparatus for constructing an on-axis hologram as set forth in claim 4 wherein said optical means includes a lens with the object wavefront and its conjugated mirror image wavefront at its front focal plane and the recording medium at its output focal plane.

6. Apparatus for constructing an on-axis hologram as set forth in claim 4 wherein said recording medium exhibits an amplitude transmission function which is linear with respect to the intensity of the light exposing the medium.

7. A method of constructing an on-axis hologram comprising:

generating the Fourier transform of an energy wavefront from a desired function at an energy sensitive surface;

biasing said Fourier transform wavefront with a bias wave in a manner wherein the axes of both wavefronts coincide to produce a real and positive function at said energy sensitive surface; and recording said biased wavefront on said energy sensitive surface.

8. A method of constructing a hologram as set forth in claim 7 wherein said energy sensitive surface has an amplitude transmission function which is linear with respect to the square root of energy intensity.

9. A method of constructing a hologram as set forth in claim 8 wherein the Fourier transform wavefront forms a stationary pattern in space with said biasing wave.

10. A method of constructing a hologram as set forth in claim 8 wherein said energy wavefront and said biasing wave are coherent light beams.

11. A method of constructing a hologram as set forth in claim 10 wherein the energy sensitive surface is a photographic emulsion.

12. A method of optically processing imagery comprising:

constructing a spatial filter by generating an energy wavefront of a desired function and its conjugated mirror image to form the Fourier transform of said wavefronts at a photosensitive surface, biasing the Fourier transform of said wavefronts with a light beam in a manner wherein the axes of both are coincident to produce a real and positive function at the photosensitive surface, and developing said photosensitive surface to record therein said biased wavefront;

transmitting an energy beam through said imagery;

focusing said energy beam on said spatial filter after transmission through said energy; and displaying said filtered energy beam on a viewing surface.

13. A method of optically processing imagery as set forth in claim 12 wherein said energy beam is generated by a laser.

14. A method of optically processing imagery as set forth in claim 13 wherein the spatial filter is constructed on a photosensitive surface having an amplitude transmission function which is linear with respect to the square root of light intensity.

15. A method of constructing a hologram comprising:

generating an object wavefront at the front focal plane of a lens;

generating the mirror image of said object wavefront at the front focal plane of said lens displaced from said object wavefront;

generating the Fourier transform of said wavefronts on a recording surface positioned at the rear focal plane of said lens; and generating a bias wavefront having an axis coincident with the axis of the Fourier transform wavefront to produce a real and positive function at the recording surface.

16. A method of constructing a hologram as set forth in claim 15 wherein said recording has an amplitude transmission function which is linear with respect to the square root of light intensity.